(12) United States Patent
Takagi

(10) Patent No.: US 7,513,704 B2
(45) Date of Patent: Apr. 7, 2009

(54) ELECTRONIC IMAGE PICKUP APPARATUS

(75) Inventor: Tetsuya Takagi, Akiruno (JP)

(73) Assignee: Olympus Corporation, Tokyo (JP)

( * ) Notice: Subject to any disclaimer, the term of this patent is extended or adjusted under 35 U.S.C. 154(b) by 625 days.

(21) Appl. No.: 11/190,518

(22) Filed: Jul. 27, 2005

(65) Prior Publication Data

US 2006/0044447 A1 Mar. 2, 2006

(30) Foreign Application Priority Data

Aug. 27, 2004 (JP) ............................. 2004-248885

(51) Int. Cl.
*G03B 17/00* (2006.01)
*G03B 7/099* (2006.01)
*G03B 11/00* (2006.01)
*H04N 9/73* (2006.01)
*H04N 5/335* (2006.01)
*G02B 5/20* (2006.01)
*G02B 7/02* (2006.01)
*G01V 8/00* (2006.01)

(52) U.S. Cl. .................. 396/529; 396/72; 396/275; 348/224.1; 348/294; 348/342; 359/723; 359/819; 250/482.1; 250/559.08

(58) Field of Classification Search ................. 396/72, 396/272, 275, 294, 298, 308, 529; 348/224.1, 348/342, 360, 272, 294, 298, 308; 359/723; 250/482.1, 339.02, 370.08, 559.07, 559.08
See application file for complete search history.

(56) References Cited

U.S. PATENT DOCUMENTS

2003/0218685 A1* 11/2003 Kawai .................... 348/340
2005/0024529 A1*  2/2005 Kurosawa ............... 348/375

FOREIGN PATENT DOCUMENTS

JP  2003-35854  2/2003

* cited by examiner

*Primary Examiner*—Rochelle-Ann J Blackman
(74) *Attorney, Agent, or Firm*—Volpe and Koenig P.C.

(57) ABSTRACT

In an electronic image pickup apparatus of the present invention, a lens barrel having optical elements arranged in the optical axis direction has a CCD for photographing a luminous flux from a subject, a CCD holder formed around the CCD to hold the CCD, and a low-pass filter provided on the front side of the CCD. A low-pass filter holder as a plate-like member to hold and fix the low-pass filter is provided to contact the low-pass filter at one end through a diaphragm on the CCD side surface, and contacts the CCD holder on the side opposite to the CCD at the other end.

1 Claim, 9 Drawing Sheets

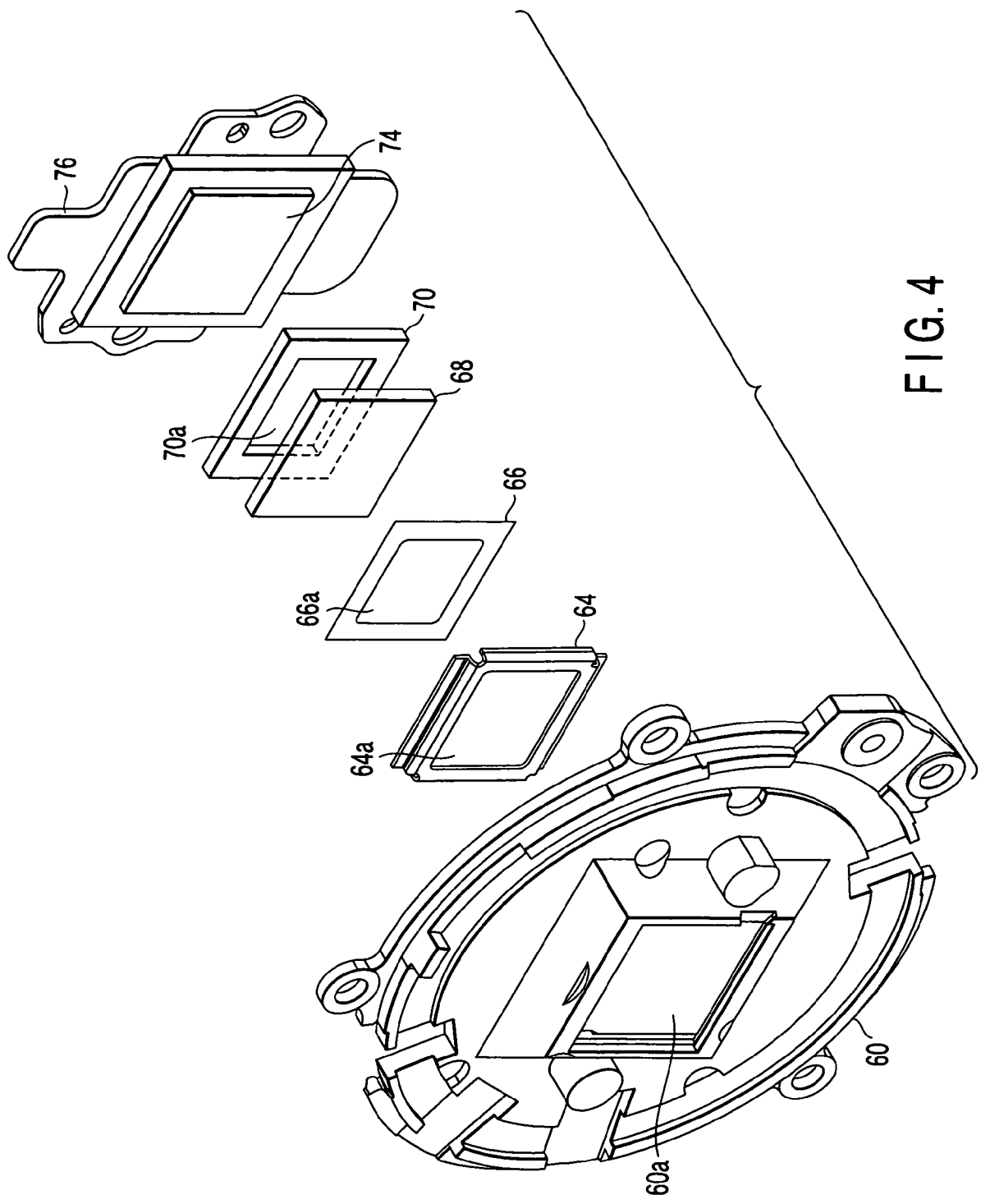
F I G. 4

ELECTRONIC IMAGE PICKUP APPARATUS

CROSS-REFERENCE TO RELATED APPLICATIONS

This application is based upon and claims the benefit of priority from prior Japanese Patent Application No. 2004-248885, filed Aug. 27, 2004, the entire contents of which are incorporated herein by reference.

BACKGROUND OF THE INVENTION

1. Field of the Invention

The present invention relates to an electronic image pickup apparatus, and more particularly an improved mechanism to fix optical elements in a camera lens barrel.

2. Description of the Related Art

Various propositions have been made for the improvement of a mechanism to hold optical elements in a lens holding mechanism.

FIG. 1 is a sectional view showing an example of the configuration of a conventional mechanism to hold optical elements.

In FIG. 1, a seal member 12 and a low-pass filter 16 are provided on a CCD 10 through a CCD rubber 14. The low-pass filter 16 is held by a low-pass filter holder 18 made of a resin member, for example. The low-pass filter 18 is formed to have a stage inside as shown in FIG. 1, and a holding part 18a at the front end has an opening and projects to a group of lenses 20. The low-pass filter 16 is fixed contacting the inside of the holding part 18a and the inside stage.

In the structure shown in FIG. 1, the low-pass filter 16 is fixed directly to the low-pass filter holder 18. Therefore, the thickness of the structure is increased in the optical axis direction by thickness of the holding part 18a. This causes a ghost image.

To solve the above problem, Jpn. Pat. Appln. KOKAI Publication No. 2003-35854 discloses a technique to hold a lens with a metallic member and to form the lens integrally with a resin-made guide member.

BRIEF SUMMARY OF THE INVENTION

Accordingly, it is an object of the present invention to provide an electronic image pickup apparatus, which can reduce the length of the optical axis and make the thickness of the whole optical unit in the optical axis direction thin, in an optical system having an optical filter.

According to an aspect of the present invention, there is provided an electrical image pickup apparatus comprising:

an image pickup element which converts a luminous flux from a subject passing through an image pickup lens into an electric signal;

an optical filter provided on the front side of the image pickup element on the subject side;

a first holding member composed of a base portion substantially parallel to the optical axis of the image pickup lens, a first extended portion extended from one end of the base portion to the direction vertical to the optical axis of the image pickup lens, separating from the optical axis of the image pickup lens, a second extended portion extended from the other end of the base portion to the direction vertical to the optical axis of the image pickup lens, approaching to the optical axis of the image pickup lens, the first holding member having at least two bent portions in the cross section, and holding the optical filter in the second extended portion; and a second holding member having the first extended portion provided in the first holding member, wherein the optical filter is attached to the second holding member through the first holding member, so that the subject side surface of the optical filter and the subject side surface of the second holding member become substantially the same level.

According to the present invention, an optical filter is held by a first holding member having a base portion and first and second extended portions, and the level of the subject side surface of the optical filter holding the optical filter is made to be substantially the same as the level of the subject side surface of the second holding member, and the length of the optical axis direction can be reduced compared with direct mounting of the optical filter on the second holding member, and the thickness of a main unit of the electronic image pickup apparatus can be made thin.

Particularly, in an electronic image pickup apparatus with a collapsible pickup lens, the collapsing length can be reduced, and more effects can be obtained.

Further, by making the first holding member of a thin plate-like metallic member, the above effect can be improved and the optical filter can be firmly held.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2A is a perspective view showing the appearance of a camera with a lens barrel collapsed;

FIG. 2B is a perspective view showing the appearance of a camera with a barrier closed;

FIG. 4 is a magnified exploded perspective view of a CCD unit after the CCD holder of FIG. 3;

DETAILED DESCRIPTION OF THE INVENTION

Embodiments of the present invention will be explained hereinafter with reference to the accompanying drawings.

Embodiment 1

Figure 1:
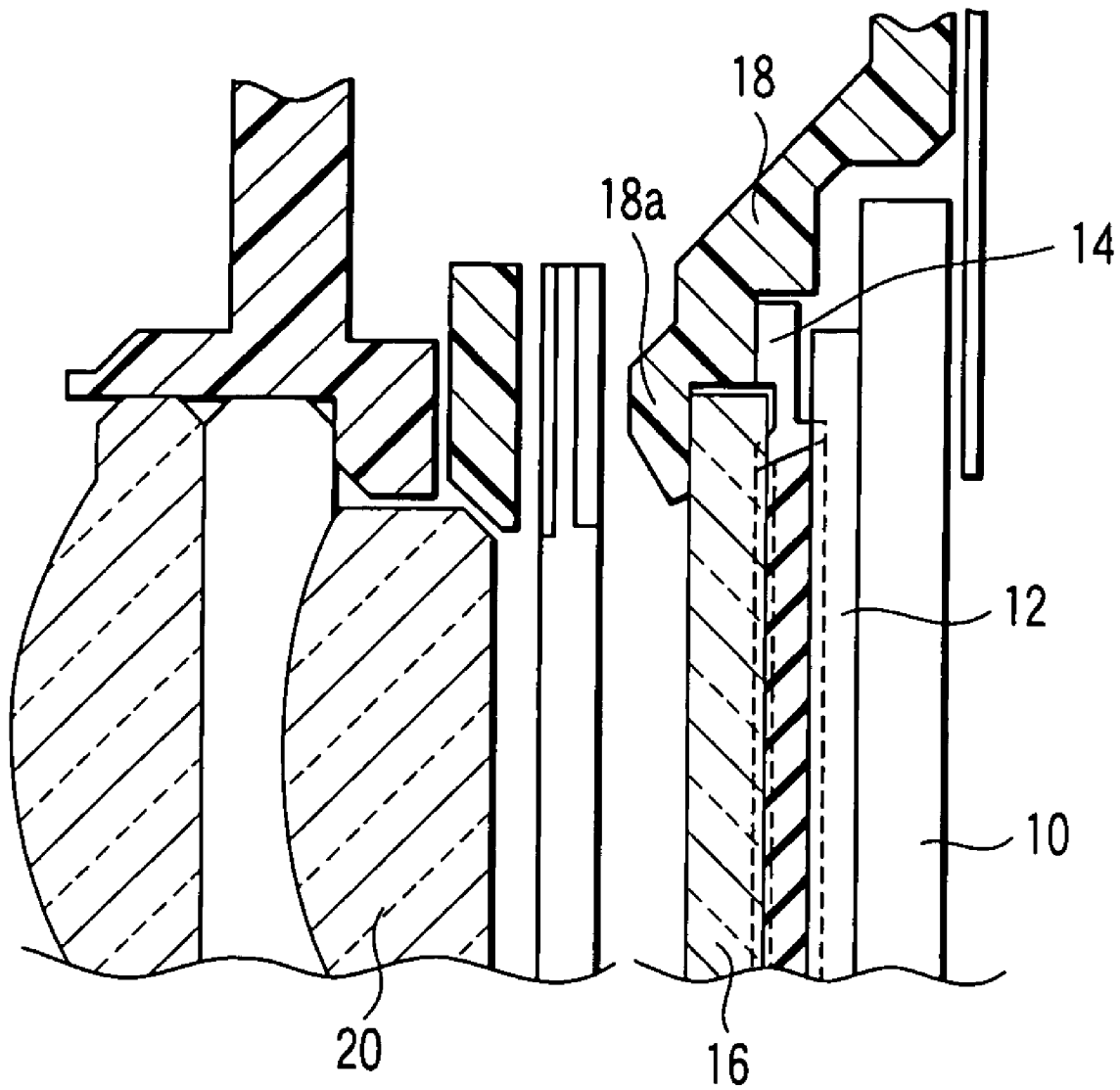
FIG. 1 is a sectional view showing the configuration of a conventional optical element holding mechanism.
Figure 2A:
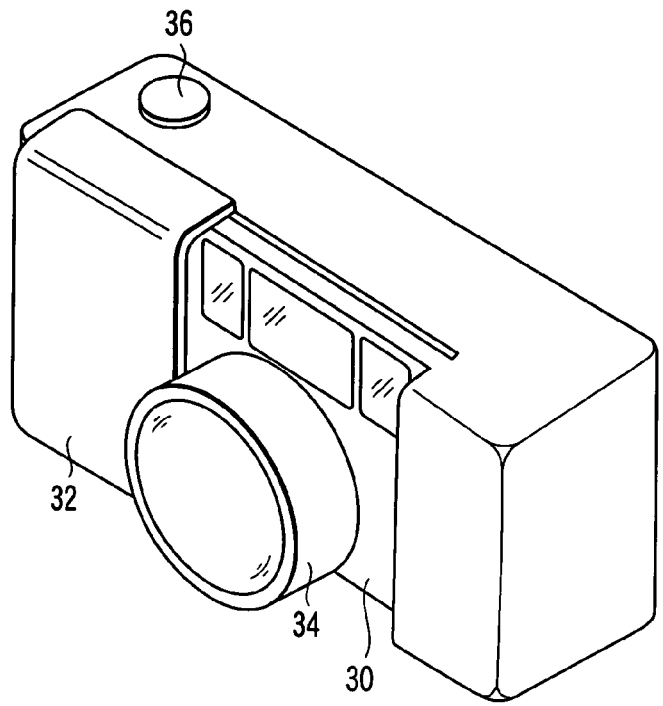
FIGS. 2A and 2B show the configuration of a first embodiment of the present invention.
Figure 2B:
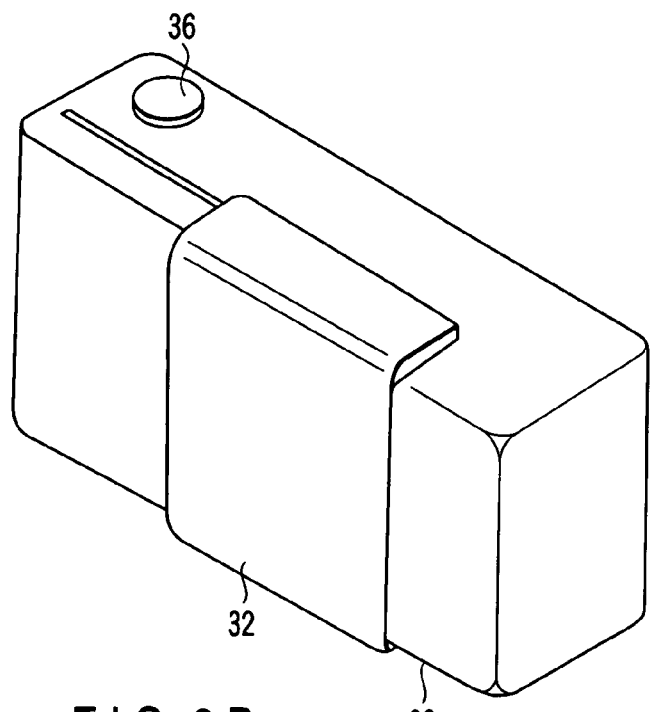

FIGS. 2A and 2B show the configuration of a first embodiment of the present invention. FIG. 2A is a perspective view showing the appearance of a camera with a lens barrel collapsed. FIG. 2B is a perspective view showing the appearance of a camera with a barrier closed.

On the front side of a camera body, a slidable barrier 32 is provided in the longitudinal direction of the camera. The barrier also serves as a switch to turn on and off the power supply of the camera. A lens barrel 34 is provided at almost the center of the front side of the camera body 30. When the barrier 32 shown in FIG. 2A is opened, the camera power switch is turned on and the lens barrel 34 is moved forward. When the barrier 32 is closed as shown in FIG. 2B, the lens barrel is collapsed and the power switch is turned off.

A release button 36 as a camera control switch is provided on the upper surface of the camera body 30.

Figure 3:
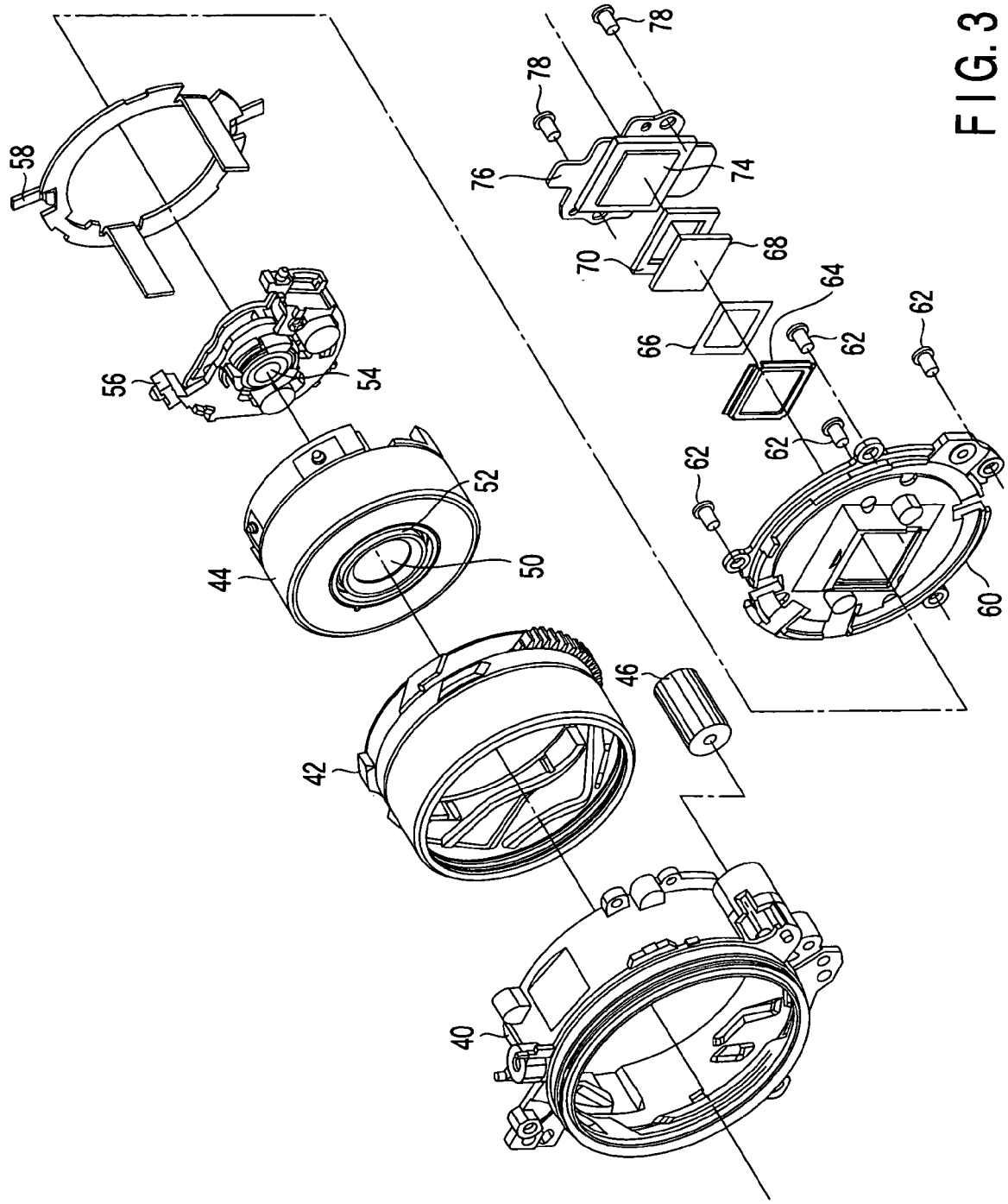
FIG. 3 is an exploded perspective view of the configuration of a lens barrel 34.

FIG. 3 is an exploded perspective view of the configuration of the lens barrel 34. FIG. 4 is a magnified exploded perspective view of a CCD unit of the CCD holder of FIG. 3.

The lens barrel 34 has a fixed frame 40 as a peripheral frame along the optical axis of optics, a rotary frame 42 rotatable long the optical axis, and a straight-moving frame 44 configured to be housed in the rotary frame 32.

Cam grooves are formed on the internal circumference of the circular part of the fixed frame 40. When projections formed on the external circumference of the circular part of the rotary frame 42 fit in these cam grooves, the rotary frame 42 is moved in the optical axis direction while rotating in a specified direction. Cam grooves are formed also on the internal circumference of the circular part of the rotary frame 42. These cam grooves fit with the projections formed on the external circumference of the circular part of the straight-moving frame 44. Thus, the straight-moving frame 44 is moved in the optical axis direction.

A reference numeral 46 in FIG. 3 denotes a long gear to be fit to the external circumference of the circular part of the fixed frame 40.

The straight-moving frame 44 contains a 1-group frame 52 having 1-group lens 50 and a 2-group frame 56 having 2-group lens 54. The 1-group frame 52 and 2-group frame 56 are provided with projections to fit in the cam groove formed on the internal circumference of the circular part of the rotary frame 42. The 1-group frame 52 and 2-group frame 56 are movable in the optical axis direction of an image pickup lens having the 1-group lens 50 and 2-group lens 54, along a float key 58 fixed to the fixed frame 40.

In the optical axis direction, at the rear of the float key 58, a CCD holder 60 as a second holding member is placed to hold and fix a CCD 74 as an image pickup element described later. The CCD holder 60 has an opening 60a at the central portion as a luminous flux passing area to take in a photographing luminous flux from a not-shown subject. The CCD holder 60 has screw holes on the periphery to fasten screws 62 to the fixed frame 40.

The CCD 74 as a pickup element is provided at the center portion of the CCD plate 76. Between the CCD 74 and the opening 60a of the CCD holder 60, a low-pass filter holder 64 as a first holding member, a diaphragm 66, a low-pass filter 68 as an optical member (optical filter), and a CCD rubber 70 as an elastic member are provided as being sequentially layered. In this state, screws 78 are fastened at specified positions of the CCD holder 60 through the screw holes formed in the CCD plate 76. The low-pass filter 68 is formed rectangular to meet the image pickup surface of the CCD 74. The low-pass filter holder 64, diaphragm 66 and CCD rubber 70 have rectangular openings 64a, 66a and 70a, respectively, as a luminous flux passing area, to meet the image pickup surface of CCD 74.

FIG. 2A to FIG. 3 do not show a seal member provided between the CCD rubber 70 and CCD 74.

Figure 5:
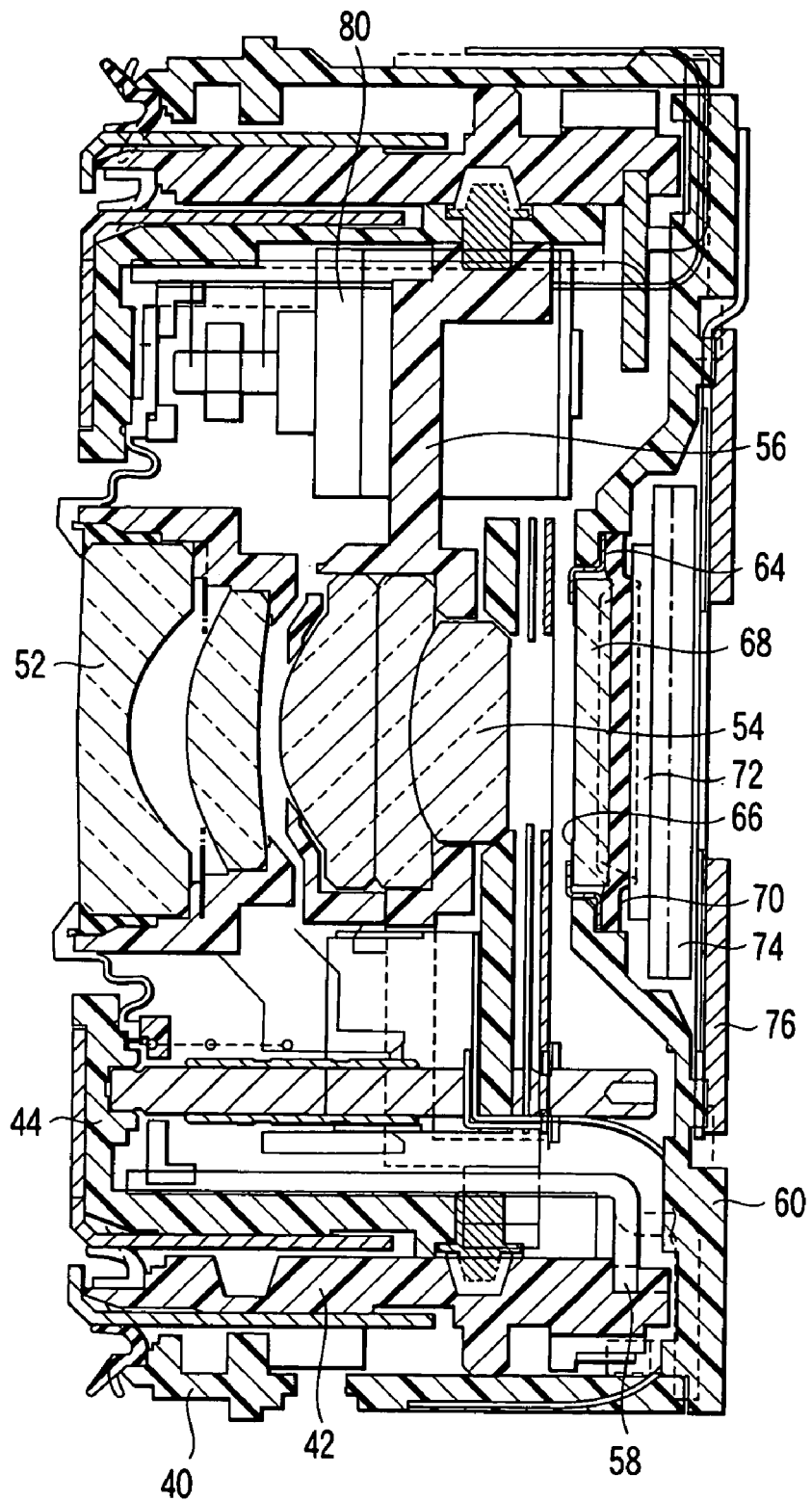
FIG. 5 is a sectional view of the configuration of a lens barrel in the collapsed state.
Figure 6:
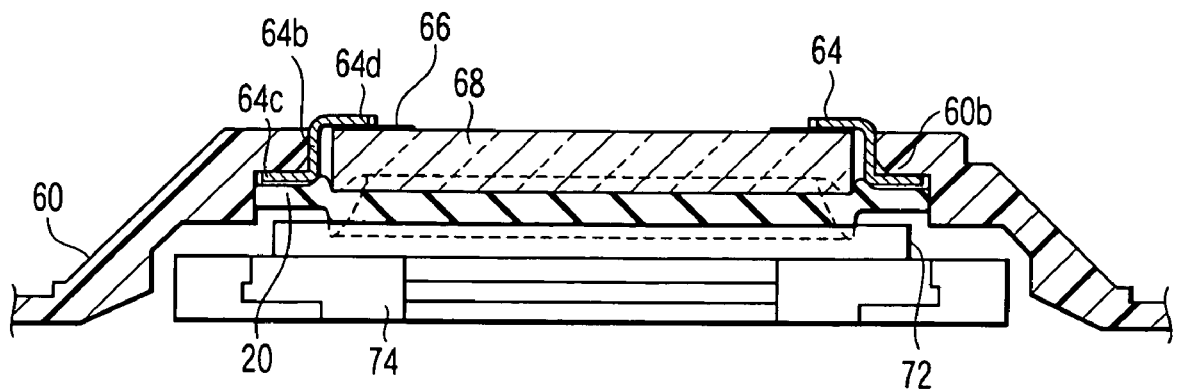
FIG. 6 is a magnified sectional view of the CCD unit of FIG. 5.

FIG. 5 is a sectional view of the configuration of a lens barrel in the collapsed state. FIG. 6 is a magnified sectional view of the CCD unit part in FIG. 5.

On the CCD 74 provided on the CCD plate 76, a seal member 72 is provided to seal between the CCD 74 and low-pass filter 68. On the seal member 72, the CCD rubber 70 having the openings and low-pass filter 68 are provided.

The low-pass filter 68 is held by the low-pass filter holder 64 fit between the opening edge portions 60b of the CCD holder 60. The low-pass filter holder 64 is formed like a crank, in which a metallic member with a plate-shaped cross section has at least two bent portions, as shown in FIGS. 5 and 6.

Namely, the low-pass filter holder 64 is composed of a base portion 64b, a first extended portion 64c, and a second extended portion 64d. The base portion 64b is configured substantially parallel to the optical axis of the image pickup lens. The first extended portion 64c is extended from one end of the base portion 64b to the direction vertical to the optical axis of the image pickup lens, separating from the optical axis of the image pickup lens. The second extended portion 64d is extended from the other end of the base portion 64b to the direction vertical to the optical axis of the image pickup lens, approaching the optical axis of the image pickup lens. The first extended portion 64c of the crank-shaped low-pass filter holder 64 contacts the diaphragm 66 provided on the low-pass filter 68 on the surface of the CCD 74, and the second extended portion 64d contacts the opening edge portion 60b of the CCD holder 60 on the opposite side of the CCD 74.

The lens side end face of the opening edge portion 60b of the CCD holder 60 and the lens side end face of the low-pass filter 68 are positioned close to be substantially the same plane. The opening 64a of the low-pass filter holder 64 is made smaller than the opening 60a (refer to FIG. 4).

In this state, the low-pass filter 68 is pressed to a not-shown subject side (opposite to the CCD 74) by the elastic force of the CCD rubber 70. Thus, the low-pass filter 68 is pressed to the second extended portion 64d of the low-pass filter holder 64. In this way, the low-pass filter 64 is held and fixed by the engaged low-pass filter holder 64 and the opening edge portion 60b of the CCD holder 60.

The CCD rubber 70 is provided to prevent dust entering from the image pickup surface of the CCD 74. The CCD rubber 70 has an opening 70a corresponding to the image pickup surface of the CCD 74 as described before (refer to FIG. 4), and a frame body part constituting the opening 70a is provided to close the CCD 70 tightly.

The low-pass filter holder 64 is made of lightproof metallic material, thereby decreasing ghosting caused by the reflection of a luminous flux from a subject appearing at the peripheral edge of a conventional holder.

A reference numeral 80 in FIG. 5 denotes an AF motor for measuring a distance by moving the lens barrel in the optical axis direction on measurement of AF distance.

Figure 7:
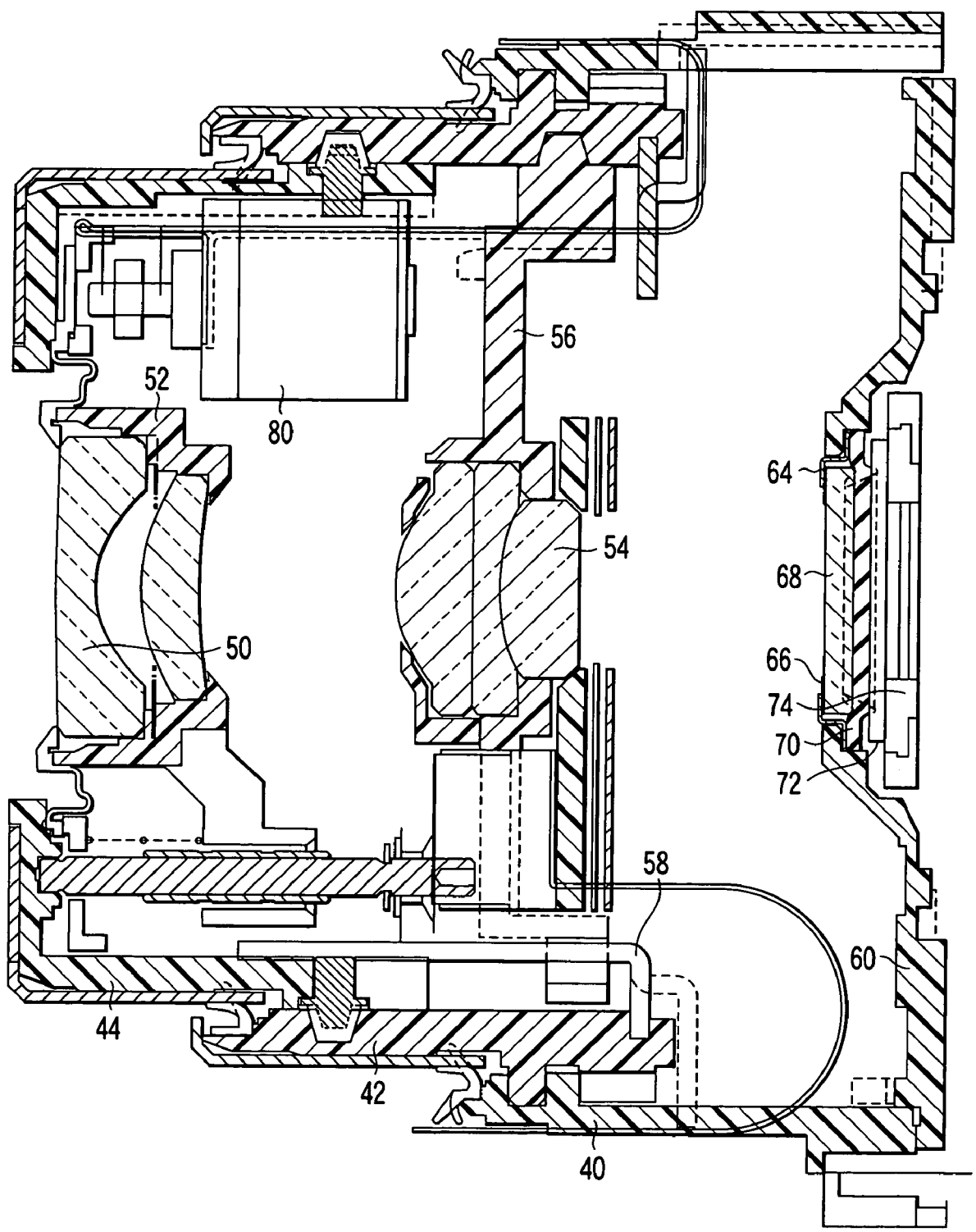
FIG. 7 is a sectional view showing the state of a lens barrel in wide-angle mode (WIDE)
Figure 8:
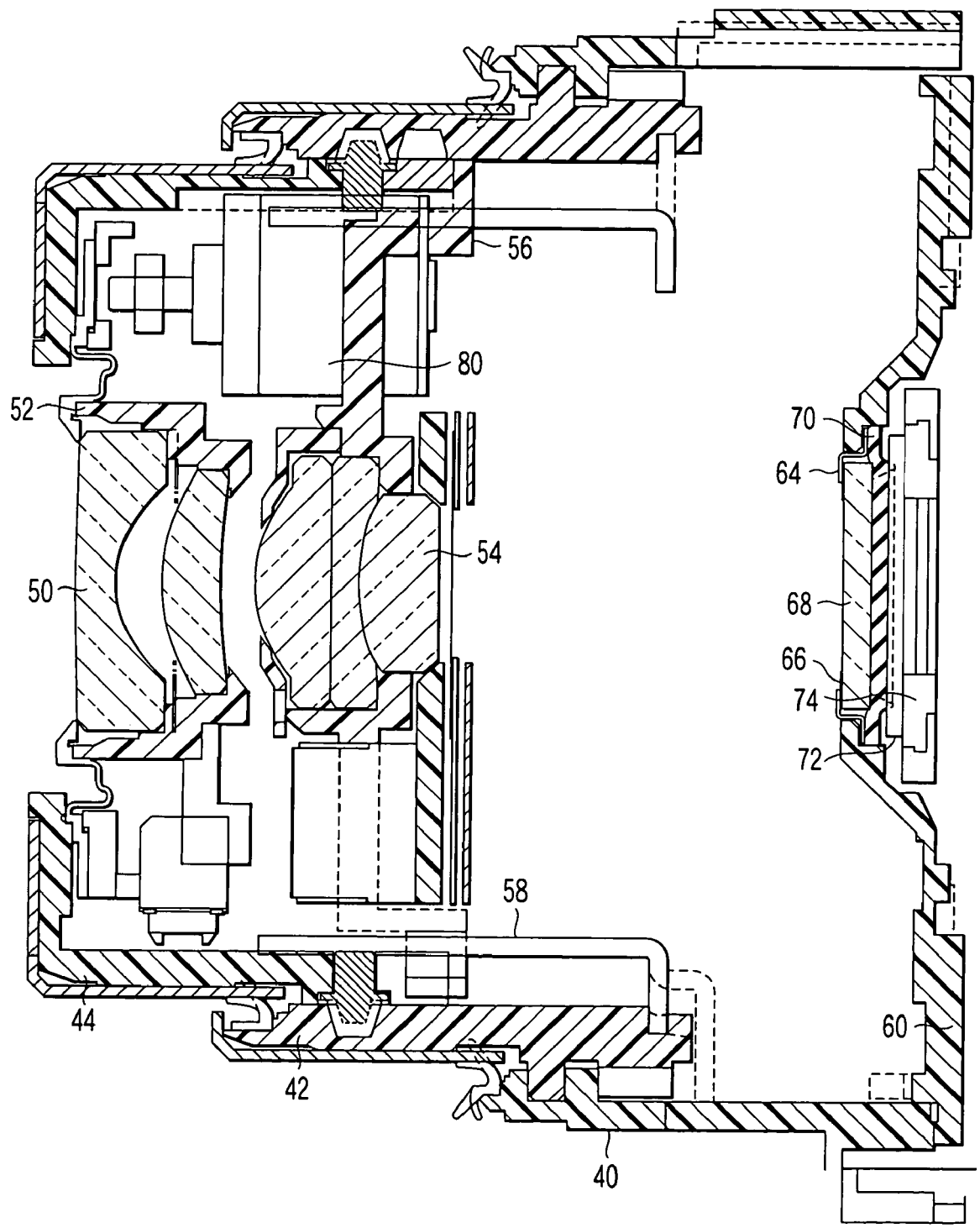
FIG. 8 is a sectional view showing the state of a lens barrel in telephotograph mode (TELE)

FIG. 7 is a sectional view showing the state of a lens barrel in wide-angle mode (WIDE). FIG. 8 is a sectional view showing the state of lens barrel in telephotograph mode (TELE).

The wide-angle and telephotograph modes are realized by a not-shown zoom button provided in the camera body. As seen from FIG. 7, the 1-group lens 50 and 2-group lens 54 are separated at the wide-angle end. As seen from FIG. 8, the 1-group lens 50 and 2-group lens 54 are approached at the telephotograph end.

As described above, in the first embodiment, a metallic member with a thin plate-like cross section is used as a fixed member of the low-pass filter holder 64 to fix the low-pass filter 68 as an optical element, and the lens side end face of the opening edge portion 60*b* of the CCD holder 60 and the lens side end face of the low-pass filter 68 are positioned close to be substantially the same level. Therefore, the thickness of the lens barrel in the optical axis direction can be made thin, and the collapse length can be reduced. In addition, a ghost image can be prevented.

Embodiment 2

A second embodiment of the present invention will be explained.

Figure 10:
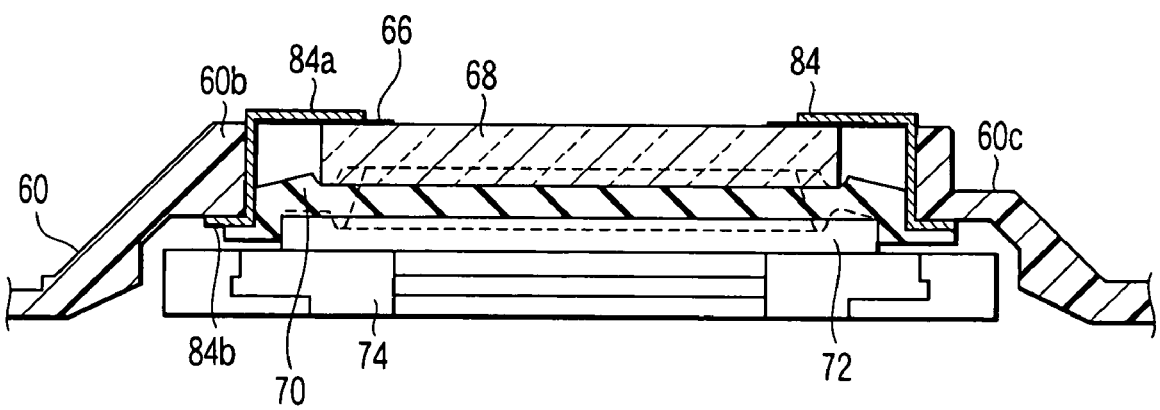
FIG. 10 is a magnified sectional view of the CCD unit of FIG. 9.
Figure 9:
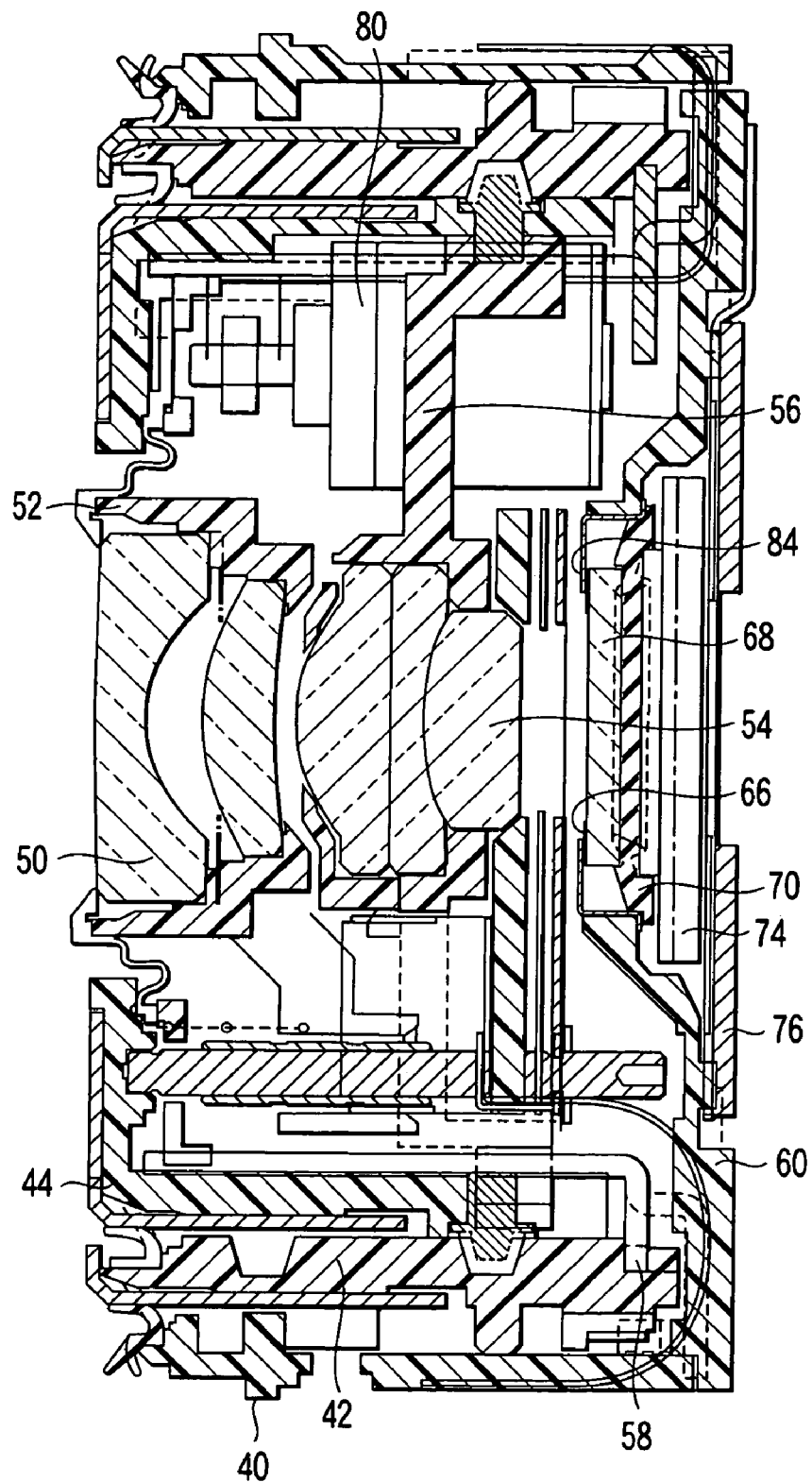
FIG. 9 shows the configuration of a second embodiment of the present invention, with a lens barrel collapsed.

FIG. 9 shows the configuration of a second embodiment of the present invention, with a lens barrel collapsed. FIG. 10 is a magnified sectional view of the CCD unit of FIG. 9.

The configuration and operation of the camera of the second embodiment are basically the same as the first embodiment shown in FIGS. 2 to 8, and the same reference numerals are given to the same components. Drawings and description will be omitted.

On the CCD 74 provided on the CCD plate 76, the seal member 72, CCD rubber 70 having an opening, and low-pass filter 68 are arranged.

The low-pass filter 68 is held by the low-pass filter holder 84 that is engaged between the opening edge portion 60*b* of the CCD holder 60. The low-pass filter holder 84 is formed by bending a metallic member with a plate-like cross section as shown in FIGS. 9 and 10.

Namely, one end portion 84*a* contacts the diaphragm 66 provided on the low-pass filter 68 on the CCD 74 side, and the other end portion 84*b* contacts the opening edge portion 60*b* of the CCD holder 60. The opening 60*a* of the CCD holder 60 is made larger than the length of the seal member 72. The CCD holder 60 of the side provided with the AF motor 80 has a notch 60*c* in the vicinity of the opening edge portion of the holder. The notch 60*c* is formed as a retreat for the AF motor 80.

In this state, the low-pass filter 68 is pressed to a not-shown subject side (opposite to the CCD 74) by the elastic force of the CCD rubber 70. Thus, the low-pass filter 68 is pressed to the end portion 84*a* of the low-pass filter holder 84. In this way, the low-pass filter 68 is held and fixed by the engaged low-pass filter holder 84 and the opening edge portion 60*b* of the CCD holder 60.

As described above, in the second embodiment, the notch 60*c* for the AF motor 80 is formed in the CCD holder 60, and the thickness of the lens barrel in the optical axis direction can be made thinner than the first embodiment.

The embodiments of the present invention have been explained hereinbefore. Various modifications are possible without departing from its spirit or essential characteristics.

The present invention is not limited to the aforementioned embodiments. The invention may be embodied by modifying the components without departing from the spirit or essential characteristics. The invention may be modified in various forms by combining components suitably. For example, some components may be deleted from those shown in the embodiments. The same components may be combined over different embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrical image pickup apparatus comprising:
   an image pickup element which converts a luminous flux from a subject passing through an image pickup lens into an electric signal;
   an optical filter provided on the front side of the image pickup element on the subject side;
   a diaphragm provided on the optical filter;
   an optical filter holding member which is made of a crank-shaped thin plate-like metallic member having two bent portions, the optical filter holding member being formed of a base portion substantially parallel to the optical axis of the image pickup lens, a first extended portion extended from one end of the base portion to the direction vertical to the optical axis of the image pickup lens, separating from the optical axis of the image pickup lens, and a second extended portion extended from the other end of the base portion to the direction vertical to the optical axis of the image pickup lens;
   an image pickup element holding member which holds the image pickup element, the image pickup element holding member having a contact portion which the first extended portion provided in the optical filter holding member contacts and a support portion which supports a base portion provided in the optical filter holding member; and
   an elastic member provided between the optical filter and the image pickup element, the elastic member pressing the optical filter to the image pickup element to press the diaphragm and the second extended portion, and to press the first extended portion provided in the optical filter holding member to the contact portion of the image pickup element holding member,
   wherein the optical filter is attached to the second extended member of the optical filter holding member made of the crank shaped thin plate-like metallic member, so that the level of the subject side surface of the optical filter and the level of the subject side surface of the image pickup element holding member become substantially the same, thereby making a portion projecting in the optical axis direction from the level of the subject side surface of the image pickup element only the thickness of the crank-shaped thin plate-like metallic member forming the optical filter holding member.

* * * * *